(12) United States Patent
Colgrove et al.

(10) Patent No.: US 9,646,039 B2
(45) Date of Patent: May 9, 2017

(54) SNAPSHOTS IN A STORAGE SYSTEM (71) Applicant: PURE Storage, INC., Mountain View, CA (US)

(72) Inventors: John Colgrove, Los Altos, CA (US); Ethan Miller, Santa Cruz, CA (US); John Hayes, Mountain View, CA (US); Cary Sandvig, Palo Alto, CA (US); Christopher Golden, Mountain View, CA (US); Jianting Cao, Mountain View, CA (US)

(73) Assignee: Pure Storage, Inc., Mountain View, CA (US)

( * ) Notice: Subject to any disclaimer, the term of this patent is extended or adjusted under 35 U.S.C. 154(b) by 610 days.

(21) Appl. No.: 14/046,870

(22) Filed: Oct. 4, 2013

(65) Prior Publication Data
US 2014/0195754 A1    Jul. 10, 2014

Related U.S. Application Data (60) Provisional application No. 61/751,142, filed on Jan. 10, 2013.

(51) Int. Cl.
*G06F 12/00* (2006.01)
*G06F 17/30* (2006.01)
(Continued)

(52) U.S. Cl.
CPC ........ *G06F 17/30345* (2013.01); *G06F 3/061* (2013.01); *G06F 3/065* (2013.01);
(Continued)

(58) Field of Classification Search
CPC ......... G06F 17/30345; G06F 17/30156; G06F 12/0891; G06F 12/121; G06F 3/0619; G06F 3/0641; G06F 3/067; G06F 3/065
See application file for complete search history.

(56) References Cited

U.S. PATENT DOCUMENTS 5,208,813 A    5/1993   Stallmo
5,940,838 A    8/1999   Schmuck et al.
(Continued)

FOREIGN PATENT DOCUMENTS

CN    103370685 A    10/2013
CN    103370686 A    10/2013
(Continued)

OTHER PUBLICATIONS

International Search Report and Written Opinion in application No. PCT/US2014/010719, mailed Mar. 7, 2014, pp. 1-12.
(Continued)

*Primary Examiner* — Reginald Bragdon
*Assistant Examiner* — Mehdi Namazi
(74) *Attorney, Agent, or Firm* — Edward J. Lenart; Kennedy Lenart Spraggins LLP (57) ABSTRACT

A system and method for creating and managing snapshots. Mediums are recorded and maintained, all of which are read-only except for the most recent mediums in use by a volume. Multiple volumes may be maintained, including a first volume which points to a first medium. When a snapshot of the first volume is taken, a second medium is created that points to the first medium. The first volume is also updated to point to the second medium. The first medium becomes the underlying medium of the second medium, and lookups are performed initially on the second medium and then on the first medium if the data is not located in the second medium.

20 Claims, 9 Drawing Sheets

(51) Int. Cl.
   *G06F 3/06* (2006.01)
   *G06F 12/0891* (2016.01)
   *G06F 12/121* (2016.01)

(52) U.S. Cl.
   CPC ............ *G06F 3/0605* (2013.01); *G06F 3/067* (2013.01); *G06F 3/0608* (2013.01); *G06F 3/0611* (2013.01); *G06F 3/0614* (2013.01); *G06F 3/0619* (2013.01); *G06F 3/0626* (2013.01); *G06F 3/0641* (2013.01); *G06F 3/0652* (2013.01); *G06F 3/0655* (2013.01); *G06F 3/0664* (2013.01); *G06F 3/0665* (2013.01); *G06F 3/0667* (2013.01); *G06F 3/0671* (2013.01); *G06F 3/0683* (2013.01); *G06F 3/0685* (2013.01); *G06F 3/0689* (2013.01); *G06F 12/0891* (2013.01); *G06F 12/121* (2013.01); *G06F 17/30156* (2013.01)

(56) References Cited

U.S. PATENT DOCUMENTS

| | | |
|---|---|---|
| 6,263,350 B1 | 7/2001 | Wollrath et al. |
| 6,412,045 B1 | 6/2002 | DeKoning et al. |
| 6,718,448 B1 | 4/2004 | Ofer |
| 6,757,769 B1 | 6/2004 | Ofer |
| 6,799,283 B1 | 9/2004 | Tamai et al. |
| 6,834,298 B1 | 12/2004 | Singer et al. |
| 6,850,938 B1 | 2/2005 | Sadjadi |
| 6,915,434 B1 | 7/2005 | Kuroda et al. |
| 6,973,549 B1 | 12/2005 | Testardi |
| 7,028,216 B2 | 4/2006 | Aizawa et al. |
| 7,039,827 B2 | 5/2006 | Meyer et al. |
| 7,216,164 B1 | 5/2007 | Whitmore et al. |
| 7,873,619 B1 | 1/2011 | Faibish et al. |
| 7,913,300 B1 | 3/2011 | Flank et al. |
| 8,352,540 B2 | 1/2013 | Anglin et al. |
| 8,560,747 B1 | 10/2013 | Tan et al. |
| 8,700,875 B1 | 4/2014 | Barron et al. |
| 9,423,967 B2 | 8/2016 | Colgrove et al. |
| 9,436,396 B2 | 9/2016 | Colgrove et al. |
| 9,436,720 B2 | 9/2016 | Colgrove et al. |
| 9,454,476 B2 | 9/2016 | Colgrove et al. |
| 9,454,477 B2 | 9/2016 | Colgrove et al. |
| 9,513,820 B1 | 12/2016 | Shalev |
| 9,516,016 B2 | 12/2016 | Colgrove et al. |
| 2002/0038436 A1 | 3/2002 | Suzuki |
| 2002/0087544 A1 | 7/2002 | Selkirk et al. |
| 2002/0112113 A1* | 8/2002 | Karpoff ................ G06F 3/0605 711/4 |
| 2002/0147862 A1 | 10/2002 | Traut et al. |
| 2004/0049572 A1 | 3/2004 | Yamamoto et al. |
| 2006/0074940 A1 | 4/2006 | Craft et al. |
| 2006/0155946 A1 | 7/2006 | Ji |
| 2006/0174074 A1* | 8/2006 | Banikazemi ........ G06F 3/0608 711/162 |
| 2007/0067585 A1 | 3/2007 | Ueda et al. |
| 2007/0171562 A1 | 7/2007 | Maejima et al. |
| 2007/0220313 A1 | 9/2007 | Katsuragi et al. |
| 2008/0059699 A1 | 3/2008 | Kubo et al. |
| 2008/0065852 A1 | 3/2008 | Moore et al. |
| 2008/0155191 A1 | 6/2008 | Anderson et al. |
| 2008/0178040 A1 | 7/2008 | Kobayashi |
| 2008/0209096 A1 | 8/2008 | Lin et al. |
| 2008/0244205 A1 | 10/2008 | Amano et al. |
| 2008/0275928 A1 | 11/2008 | Shuster |
| 2008/0285083 A1 | 11/2008 | Aonuma |
| 2009/0006587 A1 | 1/2009 | Richter |
| 2009/0037662 A1 | 2/2009 | La Frese et al. |
| 2009/0204858 A1 | 8/2009 | Kawaba |
| 2009/0228648 A1 | 9/2009 | Wack |
| 2010/0067706 A1 | 3/2010 | Anan et al. |
| 2010/0153620 A1 | 6/2010 | McKean et al. |
| 2010/0191897 A1 | 7/2010 | Zhang et al. |
| 2010/0250882 A1 | 9/2010 | Hutchison et al. |
| 2010/0281225 A1 | 11/2010 | Chen et al. |
| 2011/0167221 A1 | 7/2011 | Pangal et al. |
| 2011/0238634 A1 | 9/2011 | Kobara |
| 2012/0023375 A1 | 1/2012 | Dutta et al. |
| 2012/0198175 A1 | 8/2012 | Atkisson |
| 2012/0233416 A1* | 9/2012 | Benhase ................. G06F 3/061 711/162 |
| 2013/0042052 A1 | 2/2013 | Colgrove et al. |
| 2013/0046995 A1 | 2/2013 | Movshovitz |
| 2013/0047029 A1 | 2/2013 | Ikeuchi et al. |
| 2013/0091102 A1 | 4/2013 | Nayak |
| 2013/0205110 A1 | 8/2013 | Kettner |
| 2013/0318314 A1 | 11/2013 | Markus et al. |
| 2013/0339303 A1 | 12/2013 | Potter et al. |
| 2014/0089730 A1 | 3/2014 | Watanabe et al. |
| 2014/0172929 A1 | 6/2014 | Sedayao et al. |
| 2014/0229131 A1 | 8/2014 | Cohen et al. |
| 2014/0281308 A1 | 9/2014 | Lango et al. |
| 2015/0234709 A1 | 8/2015 | Koarashi |
| 2015/0244775 A1 | 8/2015 | Vibhor et al. |
| 2015/0278534 A1 | 10/2015 | Thiyagarajan et al. |
| 2016/0019114 A1 | 1/2016 | Han et al. |

FOREIGN PATENT DOCUMENTS

| | | |
|---|---|---|
| EP | 3066610 A1 | 9/2016 |
| EP | 3082047 A1 | 10/2016 |
| JP | 2007-087036 A | 4/2007 |
| JP | 2007-094472 A | 4/2007 |
| JP | 2008-250667 A | 10/2008 |
| JP | 2010-211681 A | 9/2010 |
| WO | WO-99/13403 A1 | 3/1999 |
| WO | 2006/083327 | 8/2006 |
| WO | WO-2008/102347 A1 | 8/2008 |
| WO | WO-2010/071655 A1 | 6/2010 |

OTHER PUBLICATIONS

Micosoft Corporation, "GCSettings.IsServerGC Property", Retrieved Oct. 27, 2013 via the WayBack Machine, 3 pages.
Microsoft Corporation, "Fundamentals of Garbage Collection", Retrieved Aug. 30, 2013 via the WayBack Machine, 11 pages.

* cited by examiner

| Medium ID | Range | State | Basis | Offset | Underlying | Stable |
|---|---|---|---|---|---|---|
| 1 | 0-999 | Q | 1 | 0 | 1 | Y |
| 2 | 0-99 | QU | 2 | 0 | 1 | Y |
| 2 | 100-999 | Q | 2 | 0 | 1 | Y |
| 5 | 0-999 | RU | 5 | 0 | 2 | N |
| 8 | 0-499 | R | 8 | 500 | 1 | N |
| 10 | 0-999 | QU | 10 | 0 | 1 | Y |
| 14 | 0-999 | RU | 14 | 0 | 10 | Y |
| 18 | 0-999 | RU | 18 | 0 | 14 | N |
| 25 | 0-999 | RU | 25 | 0 | 14 | Y |
| 33 | 0-999 | RU | 33 | 0 | 25 | N |
| 35 | 0-299 | RU | 35 | 400 | 18 | N |
| 35 | 300-499 | RU | 35 | -300 | 33 | Y |
| 35 | 500-899 | RU | 35 | -400 | 5 | N |

Q – Quiescent; R – Registered; U – Unmask

SNAPSHOTS IN A STORAGE SYSTEM

CROSS REFERENCE TO RELATED APPLICATIONS

This application claims the benefit of U.S. Provisional Application No. 61/751,142, filed Jan. 10, 2013, the entirety of which is incorporated herein by reference.

BACKGROUND OF THE INVENTION

Field of the Invention

This invention relates to creating and maintaining snapshots in a storage system.

Description of the Related Art

As computer memory storage and data bandwidth increase, so does the amount and complexity of data that businesses daily manage. Large-scale distributed storage systems, such as data centers, typically run many business operations. A datacenter, which also may be referred to as a server room, is a centralized repository, either physical or virtual, for the storage, management, and dissemination of data pertaining to one or more businesses. A distributed storage system may be coupled to client computers interconnected by one or more networks. If any portion of the distributed storage system has poor performance, company operations may be impaired. A distributed storage system therefore maintains high standards for data availability and high-performance functionality.

Many techniques have been employed by storage systems to maintain high performance. For example, snapshots may be utilized to capture and store data at a particular point in time. A snapshot may be taken of a logical volume, and the snapshot may be stored to preserve the contents of the volume. If the data associated with the volume is later lost or corrupted, the volume can be restored from the snapshot.

As the amount of data corresponding to a snapshot increases, and as the overall number of snapshots being taken and stored increases, the storage utilization and processing overhead of the storage system likewise increases. Current techniques for taking and storing snapshots are inefficient and unduly increase the complexity, processing load, and storage requirements of the storage system.

In view of the above, systems and methods for efficiently creating and managing snapshots are desired.

SUMMARY OF THE INVENTION

Various embodiments of systems and methods for creating and managing snapshots are contemplated.

In one embodiment, a data storage system includes a storage controller and a plurality of storage devices. The storage system may be coupled to one or more host client systems. In one embodiment, the storage controller may utilize logical volumes and mediums to track client data that is stored in the data storage system. A medium is defined as a logical grouping of data, and each medium has an identifier with which to identify the logical grouping of data. The storage controller may maintain a volume to medium mapping table to map each volume to a single medium, and this medium is referred to as the volume's anchor medium. A given request received by the storage controller may indicate at least a volume and block address, and the storage controller may determine an anchor medium targeted by the given request from the volume to medium mapping table.

Each medium may be mapped to any number of other mediums, and the storage controller may maintain a medium mapping table to track mappings between mediums. In some cases, a medium may be split up into multiple ranges, and each range of the medium may be tracked separately by the medium mapping table. Additionally, a medium (or a portion thereof) may be mapped to another medium (or a portions thereof) using an offset. For example, an offset may be used to align the blocks of a first range of a first medium to the blocks of second range of a second medium. In this way, the first range of the first medium need not be aligned to the start of the second range of the second medium, but can map to any location within the second range of the second medium.

For a given request, a lookup performed for a given volume may initially look in the corresponding anchor medium for a desired block of data, and if the block is not there, then the lookup may continue in the underlying medium of the anchor medium. The lookup can continue through successive underlying mediums until the block of data is found.

In another embodiment, the storage controller may receive a request to take a snapshot of a first volume. A lookup of the volume to medium mapping table may determine that the first volume points to a first medium. A second medium may be created, and the first medium may be recorded as the underlying medium of the second medium. At this point, the first medium may be made stable so that its user data will remain unchanged. Also, the volume to medium mapping table may be updated so that the first volume now points to the second medium.

These and other embodiments will become apparent upon consideration of the following description and accompanying drawings.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention.

Figure 1:
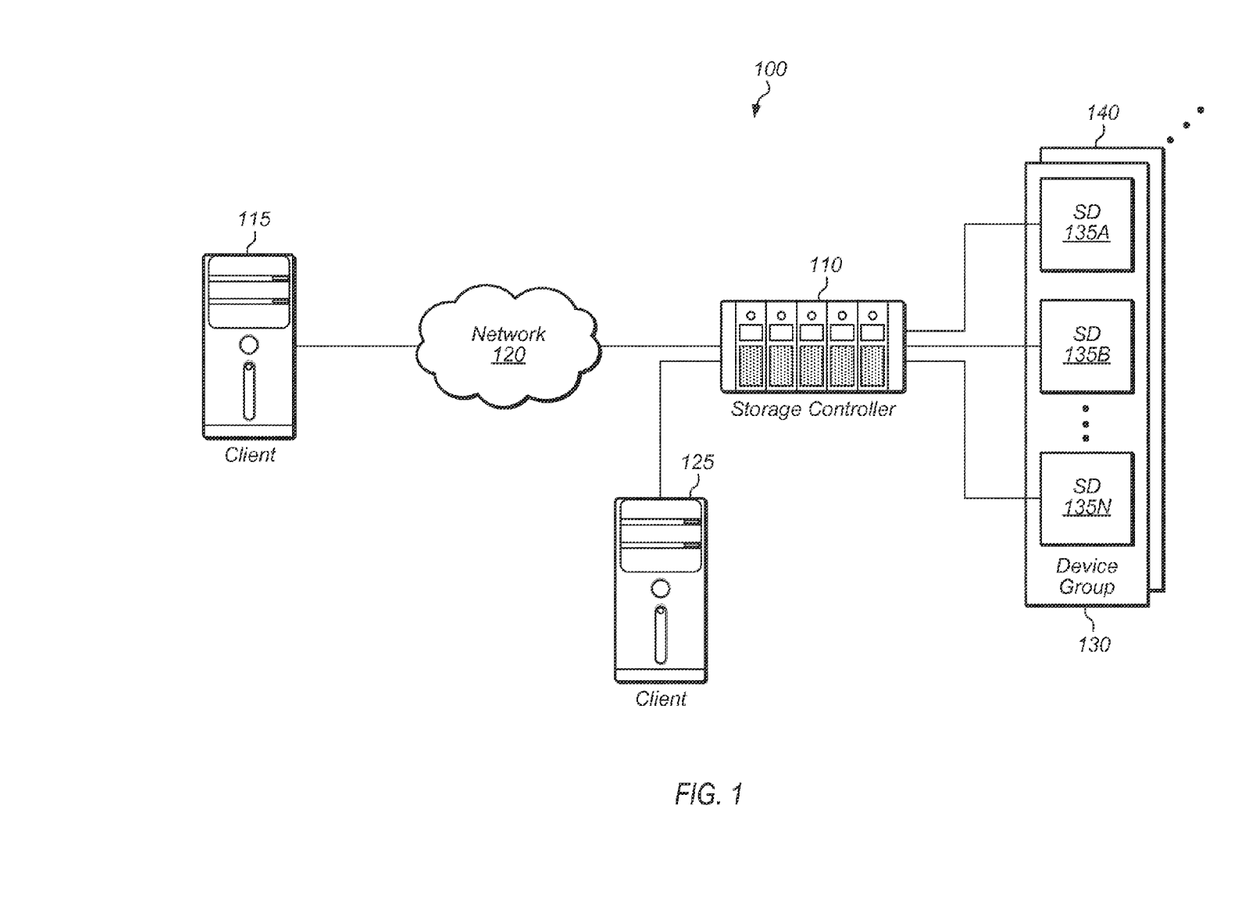
FIG. 1 is a generalized block diagram illustrating one embodiment of a storage system.

Referring now to FIG. 1, a generalized block diagram of one embodiment of a storage system 100 is shown. Storage system 100 may include storage controller 110 and storage device groups 130 and 140, which are representative of any number of storage device groups (or data storage arrays). As shown, storage device group 130 includes storage devices 135A-N, which are representative of any number and type of storage devices (e.g., solid-state drives (SSDs)). Storage controller 110 may be coupled directly to client computer system 125, and storage controller 110 may be coupled remotely over network 120 to client computer system 115. Clients 115 and 125 are representative of any number of clients which may utilize storage controller 110 for storing and accessing data in system 100. It is noted that some systems may include only a single client, connected directly or remotely to storage controller 110.

Storage controller 110 may include software and/or hardware configured to provide access to storage devices 135A-N. Although storage controller 110 is shown as being separate from storage device groups 130 and 140, in some embodiments, storage controller 110 may be located within one or each of storage device groups 130 and 140. Storage controller 110 may include or be coupled to a base operating system (OS), a volume manager, and additional control logic for implementing the various techniques disclosed herein.

Storage controller 110 may include and/or execute on any number of processors and may include and/or execute on a single host computing device or be spread across multiple host computing devices, depending on the embodiment. In some embodiments, storage controller 110 may generally include or execute on one or more file servers and/or block servers. Storage controller 110 may use any of various techniques for replicating data across devices 135A-N to prevent loss of data due to the failure of a device or the failure of storage locations within a device. Storage controller 110 may also utilize any of various deduplication techniques for reducing the amount of data stored in devices 135A-N by deduplicating common data.

Storage controller 110 may also be configured to create and manage snapshots in system 100. A set of mediums may be recorded and maintained by storage controller 110. Most of the mediums may be read-only except for one or more selected mediums such as the most recent medium in use by a particular volume. Each medium logically comprises all of the blocks in the medium. However, only the blocks that were changed from the time the medium was created to the time the medium was closed are saved and mappings to these blocks may also be maintained with the medium.

In various embodiments, multiple mapping tables may be maintained by storage controller 110. These mapping tables may include a medium mapping table and a volume to medium mapping table. These tables may be utilized to record and maintain the mappings between mediums and underlying mediums and the mappings between volumes and mediums. Storage controller 110 may also include an address translation table with a plurality of entries, wherein each entry holds a virtual-to-physical mapping for a corresponding data component. This mapping table may be used to map logical read/write requests from each of the client computer systems 115 and 125 to physical locations in storage devices 135A-N. A "physical" pointer value may be read from the mappings associated with a given medium during a lookup operation corresponding to a received read/write request. The term "mappings" is defined as the one or more entries of the address translation mapping table which convert a given medium ID and block number into a physical pointer value. This physical pointer value may then be used to locate a physical location within the storage devices 135A-N. It is noted the physical pointer value may be used to access another mapping table within a given storage device of the storage devices 135A-N. Consequently, one or more levels of indirection may exist between the physical pointer value and a target storage location.

It is noted that in alternative embodiments, the number and type of client computers, storage controllers, networks, storage device groups, and data storage devices is not limited to those shown in FIG. 1. At various times one or more clients may operate offline. In addition, during operation, individual client computer connection types may change as users connect, disconnect, and reconnect to system 100. Further, the systems and methods described herein may be applied to directly attached storage systems or network attached storage systems and may include a host operating system configured to perform one or more aspects of the described methods. Numerous such alternatives are possible and are contemplated.

Network 120 may utilize a variety of techniques including wireless connection, direct local area network (LAN) connections, wide area network (WAN) connections such as the Internet, a router, storage area network, Ethernet, and others. Network 120 may comprise one or more LANs that may also be wireless. Network 120 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in network 120. The network 120 may interface with a set of communications protocols used for the Internet such as the Transmission Control Protocol (TCP) and the Internet Protocol (IP), or TCP/IP.

Client computer systems 115 and 125 are representative of any number of stationary or mobile computers such as desktop personal computers (PCs), servers, server farms, workstations, laptops, handheld computers, servers, personal digital assistants (PDAs), smart phones, and so forth. Generally speaking, client computer systems 115 and 125 include one or more processors comprising one or more processor cores. Each processor core includes circuitry for executing instructions according to a predefined general-purpose instruction set. For example, the x86 instruction set architecture may be selected. Alternatively, the ARM®, Alpha®, PowerPC®, SPARC®, or any other general-purpose instruction set architecture may be selected. The processor cores may access cache memory subsystems for data and computer program instructions. The cache subsystems may be coupled to a memory hierarchy comprising random access memory (RAM) and a storage device.

Figure 2:
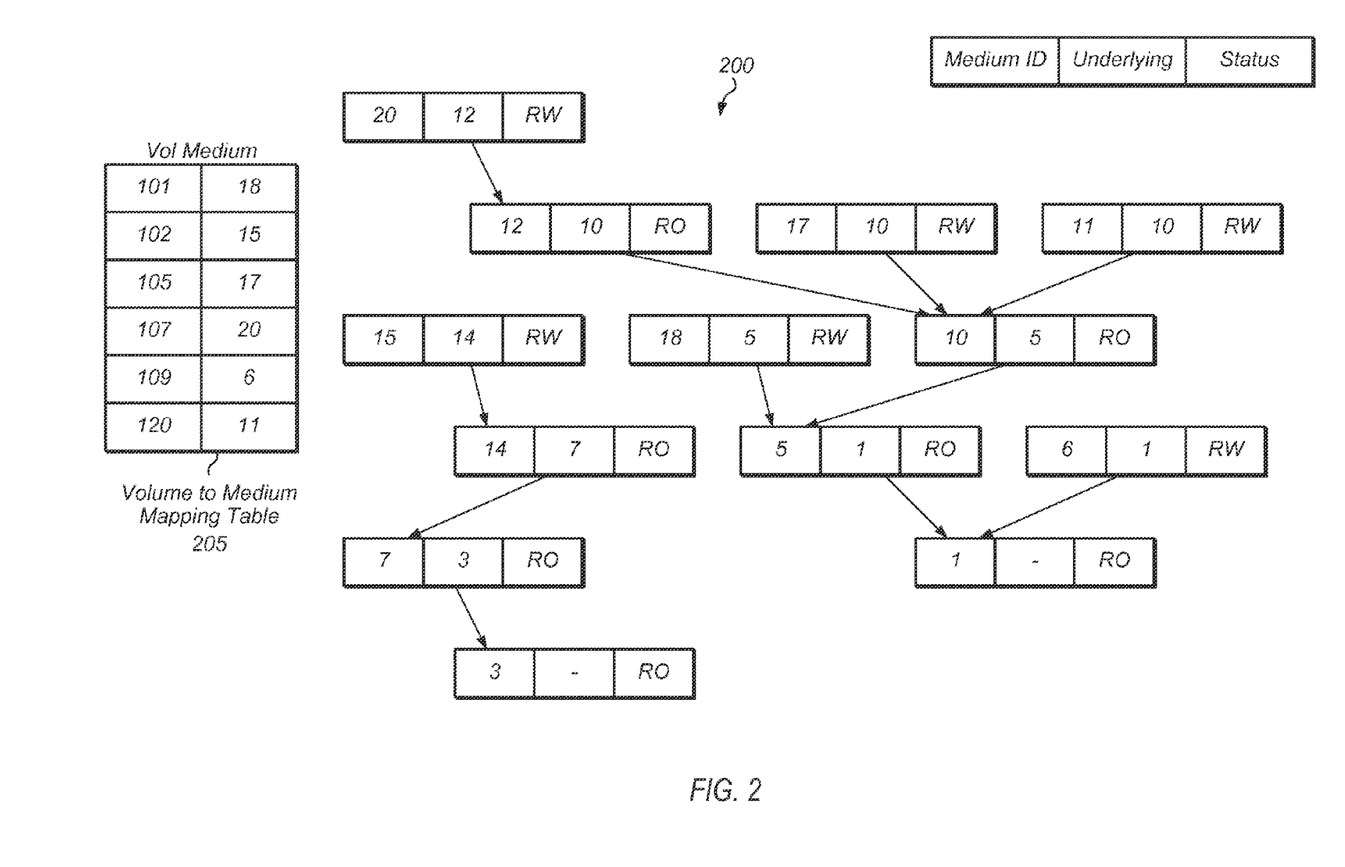
FIG. 2 is a generalized block diagram of one embodiment of a directed acyclic graph (DAG) of mediums.

Referring now to FIG. 2, a block diagram illustrating a directed acyclic graph (DAG) 200 of mediums is shown. Also shown is a volume to medium mapping table 205 which shows which medium a volume maps to for each volume in use by a storage system. Volumes may be considered pointers into graph 200.

The term "medium" as is used herein is defined as a logical grouping of data. A medium may have a corresponding identifier with which to identify the logical grouping of data. Each medium may also include or be associated with mappings of logical block numbers to content location, deduplication entries, and other information. In one embodiment, medium identifiers may be used by the storage controller but medium identifiers may not be user-visible. A user (or client) may send a data request accompanied by a volume ID to specify which data is targeted by the request, and the storage controller may map the volume ID to a medium ID and then use the medium ID when processing the request.

The term medium is not to be confused with the terms "storage medium" or "computer readable storage medium". A storage medium is defined as an actual physical device (e.g., SSD, HDD) that is utilized to store data. A computer readable storage medium (or non-transitory computer readable storage medium) is defined as a physical storage medium configured to store program instructions which are executable by a processor or other hardware device. Various types of program instructions that implement the methods and/or mechanisms described herein may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

It is also noted that the term "volume to medium mapping table" may refer to multiple tables rather than just a single table. Similarly, the term "medium mapping table" may also refer to multiple tables rather than just a single table. It is further noted that volume to medium mapping table 205 is only one example of a volume to medium mapping table. Other volume to medium mapping tables may have other numbers of entries for other numbers of volumes.

Each medium is depicted in graph 200 as three conjoined boxes, with the leftmost box showing the medium ID, the middle box showing the underlying medium, and the rightmost box displaying the status of the medium (RO—read-only) or (RW—read-write). Within graph 200, a medium points to its underlying medium. For example, medium 20 points to medium 12 to depict that medium 12 is the underlying medium of medium 20. Medium 12 also points to medium 10, which in turn points to medium 5, which in turn points to medium 1. Some mediums are the underlying medium for more than one higher-level medium. For example, three separate mediums (12, 17, 11) point to medium 10, two separate mediums (18, 10) point to medium 5, and two separate mediums (6, 5) point to medium 1. Each of the mediums which is an underlying medium to at least one higher-level medium has a status of read-only.

The set of mediums on the bottom left of graph 200 is an example of a linear set. As depicted in graph 200, medium 3 was created first and then a snapshot was taken resulting in medium 3 becoming stable (i.e., the result of a lookup for a given block in medium 3 will always return the same value after this point). Medium 7 was created with medium 3 as its underlying medium. Any blocks written after medium 3 became stable were labeled as being in medium 7. Lookups to medium 7 return the value from medium 7 if one is found, but will look in medium 3 if a block is not found in medium 7. At a later time, a snapshot of medium 7 is taken, medium 7 becomes stable, and medium 14 is created. Lookups for blocks in medium 14 would check medium 7 and then medium 3 to find the targeted logical block. Eventually, a snapshot of medium 14 is taken and medium 14 becomes stable while medium 15 is created. At this point in graph 200, medium 14 is stable with writes to volume 102 going to medium 15.

Volume to medium mapping table 205 maps user-visible volumes to mediums. Each volume may be mapped to a single medium, also known as the anchor medium. This anchor medium, as with all other mediums, may take care of its own lookups. A medium on which multiple volumes depend (such as medium 10) tracks its own blocks independently of the volumes which depend on it. Each medium may also be broken up into ranges of blocks, and each range may be treated separately in medium DAG 200.

Figure 3:
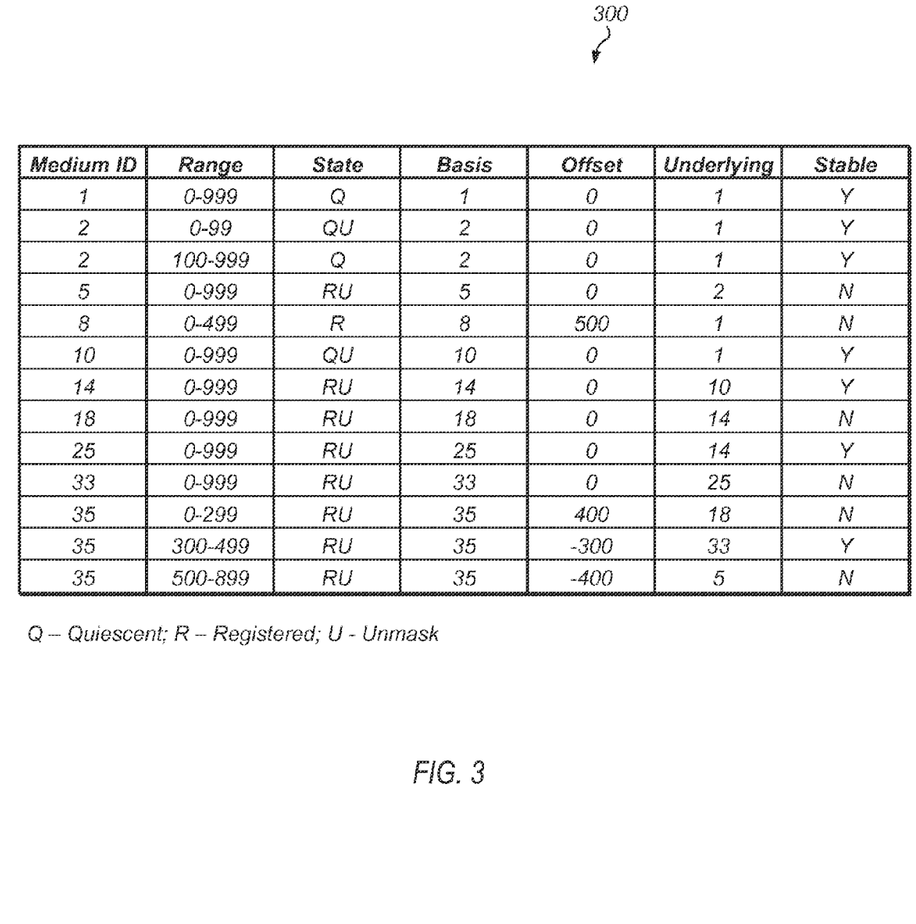
FIG. 3 illustrates one embodiment of a medium mapping table.

Referring now to FIG. 3, one embodiment of a medium mapping table 300 is shown. Any portion of or the entirety of medium mapping table 300 may be stored in storage controller 110 and/or in one or more of storage devices 135A-N. A volume identifier (ID) may be used to access volume to medium mapping table 205 to determine a medium ID corresponding to the volume ID. This medium ID may then be used to access medium mapping table 300. It is noted that table 300 is merely one example of a medium mapping table, and that in other embodiments, other medium mapping tables, with other numbers of entries, may be utilized. In addition, in other embodiments, a medium mapping table may include other attributes and be organized in a different manner than that shown in FIG. 3. It is also noted that any suitable data structure may be used to store the mapping table information in order to provide for efficient searches (e.g., b-trees, binary trees, hash tables, etc.). All such data structures are contemplated.

Each medium may be identified by a medium ID, as shown in the leftmost column of table 300. A range attribute may also be included in each entry of table 300, and the range may be in terms of data blocks. The size of a block of data (e.g., 4 KB, 8 KB) may vary depending on the embodiment. A medium may be broken up into multiple ranges, and each range of a medium may be treated as if it is an independent medium with its own attributes and mappings. For example, medium ID 2 has two separate ranges. Range 0-99 of medium ID 2 has a separate entry in table 300 from the entry for range 100-999 of medium ID 2.

Although both of these ranges of medium ID 2 map to underlying medium ID 1, it is possible for separate ranges of the same source medium to map to different underlying mediums. For example, separate ranges from medium ID 35 map to separate underlying mediums. For example, range 0-299 of medium ID 35 maps to underlying medium ID 18 with an offset of 400. This indicates that blocks 0-299 of medium ID 35 map to blocks 400-699 of medium ID 18. Additionally, range 300-499 of medium ID 35 maps to underlying medium ID 33 with an offset of −300 and range 500-899 of medium ID 35 maps to underlying medium ID 5 with an offset of −400. These entries indicate that blocks 300-499 of medium ID 35 map to blocks 0-199 of medium ID 33 while blocks 500-899 of medium ID 35 map to blocks 100-499 of medium ID 5. It is noted that in other embodiments, mediums may be broken up into more than three ranges.

The state column of table 300 records information that allows lookups for blocks to be performed more efficiently. A state of "Q" indicates the medium is quiescent, "R" indicates the medium is registered, and "U" indicates the medium is unmasked. In the quiescent state, a lookup is performed on exactly one or two mediums specified in table 300. In the registered state, a lookup is performed recursively. The unmasked state determines whether a lookup should be performed in the basis medium, or whether the lookup should only be performed in the underlying medium. Although not shown in table 300 for any of the entries, another state "X" may be used to specify that the source medium is unmapped. The unmapped state indicates that the source medium contains no reachable data and can be discarded. This unmapped state may apply to a range of a source medium. If an entire medium is unmapped, then the medium ID may be entered into a sequence invalidation table and eventually discarded.

In one embodiment, when a medium is created, the medium is in the registered state if it has an underlying medium, or the medium is in the quiescent state if it is a brand-new volume with no pre-existing state. As the medium is written to, parts of it can become unmasked, with mappings existing both in the medium itself and the underlying medium. This may be done by splitting a single range into multiple range entries, some of which retain the original masked status, and others of which are marked as unmasked.

In addition, each entry in table 300 may include a basis attribute, which indicates the basis of the medium, which in this case points to the source medium itself. Each entry may also include an offset field, which specifies the offset that should be applied to the block address when mapping the source medium to an underlying medium. This allows mediums to map to other locations within an underlying medium rather than only being built on top of an underlying medium from the beginning block of the underlying medium. As shown in table 300, medium 8 has an offset of 500, which Indicates that block 0 of medium 8 will map to block 500 of its underlying medium (medium 1). Therefore, a lookup of medium 1 via medium 8 will add an offset of 500 to the original block number of the request. The offset column allows a medium to be composed of multiple mediums. For example, in one embodiment, a medium may be composed of a "gold master" operating system image and per-VM (virtual machine) scratch space. Other flexible mappings are also possible and contemplated.

Each entry also includes an underlying medium attribute, which indicates the underlying medium of the source medium. If the underlying medium points to the source medium (as with medium 1), then this indicates that the source medium does not have an underlying medium, and all lookups will only be performed in the source medium. Each entry may also include a stable attribute, with "Y" (yes) indicating the medium is stable (or read-only), and with "N" (no) indicating the medium is read-write. In a stable medium, the data corresponding to a given block in the medium never changes, though the mapping that produces this data may change. For example, medium 2 is stable, but block 50 in medium 2 might be recorded in medium 2 or in medium 1, which may be searched logically in that order, though the searches may be done in parallel if desired. In one embodiment, a medium will be stable if the medium is used as an underlying medium by any medium other than itself.

Figure 4:
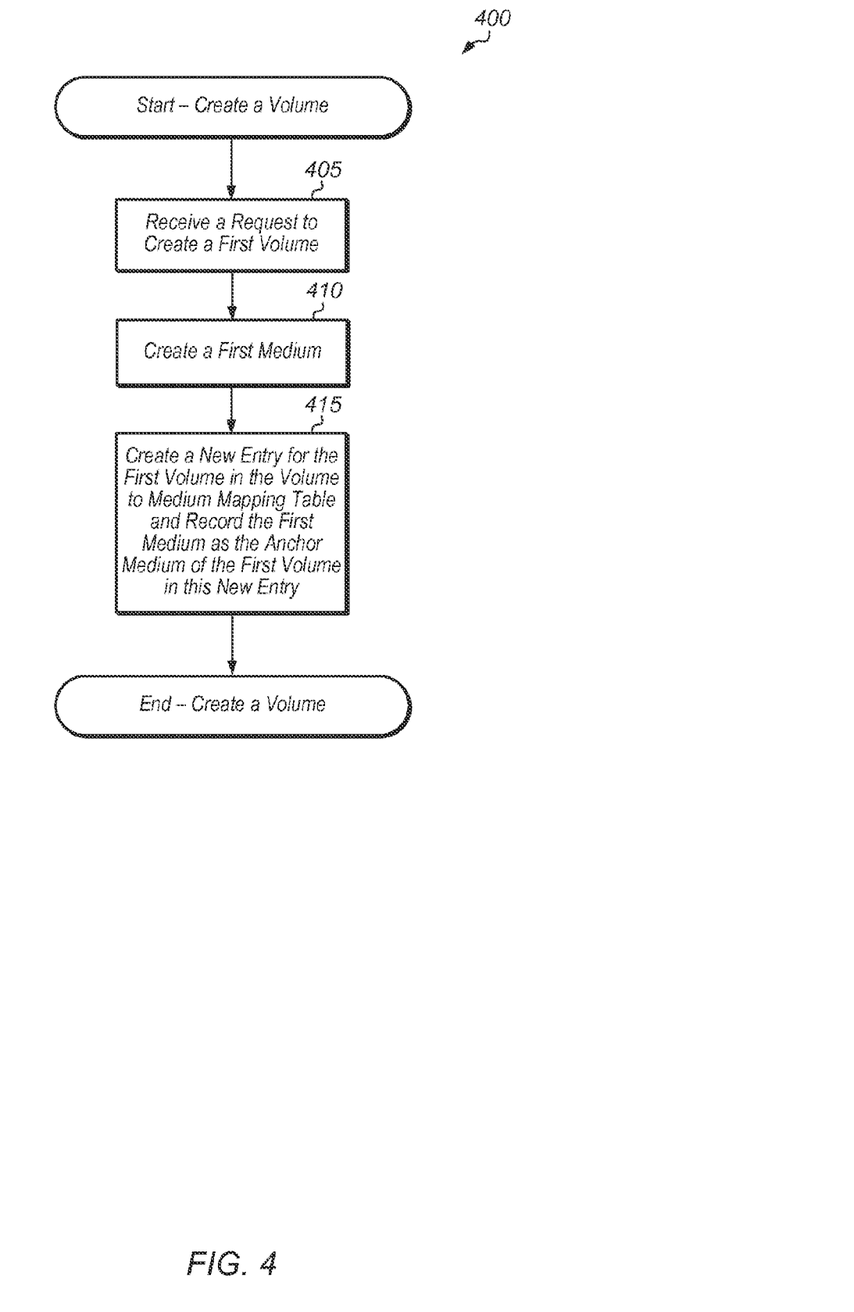
FIG. 4 is a generalized flow diagram illustrating one embodiment of a method for creating a volume.

Turning now to FIG. 4, one embodiment of a method 400 for creating a volume is shown. The components embodied in system 100 described above (e.g., storage controller 110) may generally operate in accordance with method 400. In addition, the steps in this embodiment are shown in sequential order. However, some steps may occur in a different order than shown, some steps may be performed concurrently, some steps may be combined with other steps, and some steps may be absent in another embodiment.

A request to create a first volume may be received by a storage controller (block 405). In one embodiment, the request may be generated by a client. Next, a first medium corresponding to the first volume may be created (block 410). The creation of the first medium may consist of generating a new ID for the first medium and generating a new entry for the first medium in the medium mapping table. Then, a new entry may be created for the first volume in the volume to medium mapping table and the first medium may be recorded as the anchor medium of the first volume in this new entry (block 415). The creation of the new entry for the first volume in the volume to medium mapping table implicitly creates the first volume. Any number of volumes and mediums may be created using the above-described method. Also, any number of volumes and mediums may be created in parallel depending on the operating conditions of system 100.

Figure 5:
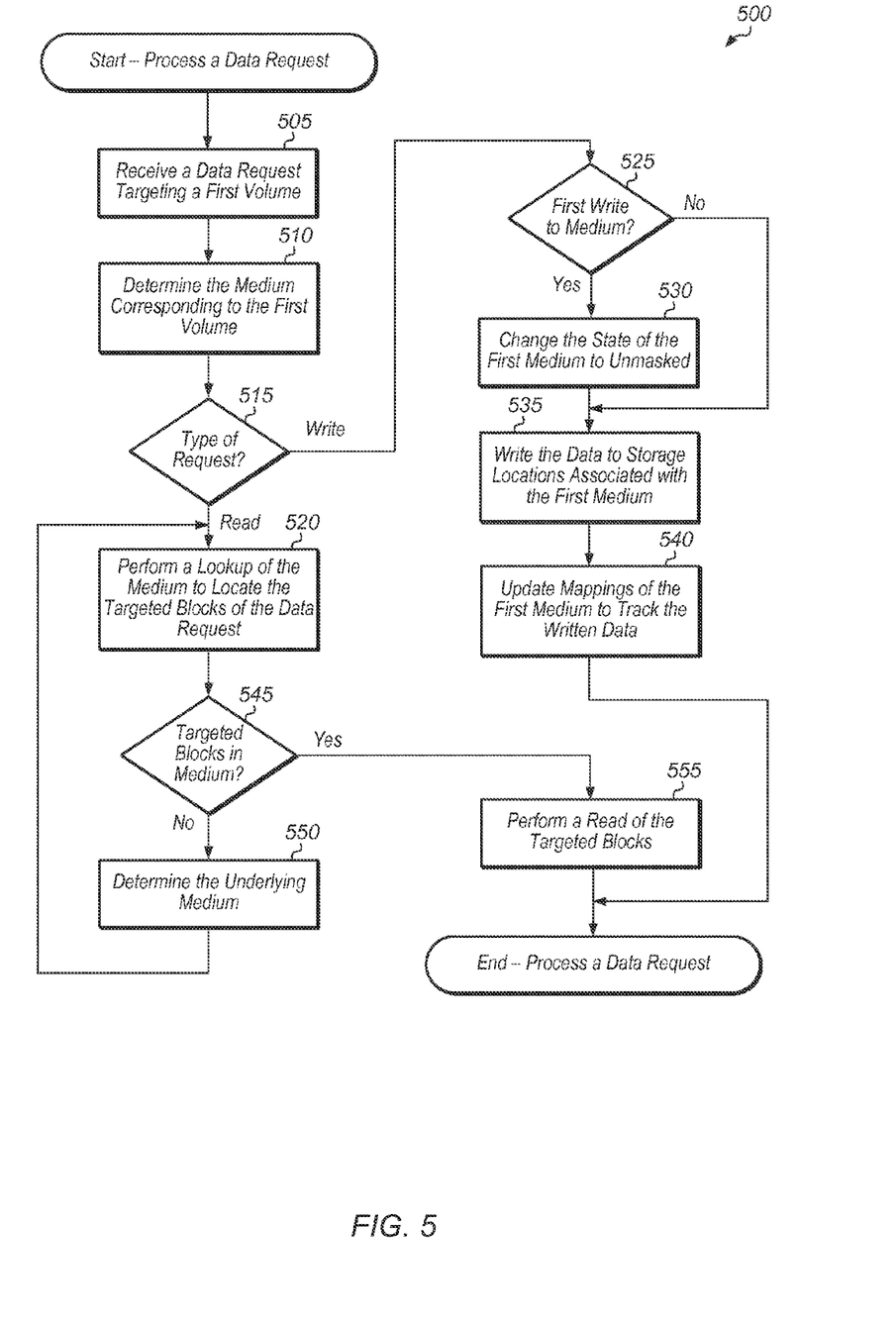
FIG. 5 is a generalized flow diagram illustrating one embodiment of a method for processing a data request.

Referring now to FIG. 5, one embodiment of a method 500 for processing a data request is shown. The components embodied in system 100 described above (e.g., storage controller 110) may generally operate in accordance with method 500. In addition, the steps in this embodiment are shown in sequential order. However, some steps may occur in a different order than shown, some steps may be performed concurrently, some steps may be combined with other steps, and some steps may be absent in another embodiment.

A data request targeting a first volume may be received by a storage controller (block 505). The data request may be a write request or a read request. In one embodiment, the data request may include a volume identifier as well as the address of the blocks that are targeted. Alternatively, the data request may not include a volume identifier, and the storage controller may determine the volume being targeted from the address.

The storage controller may then determine to which medium the first volume points (block 510). In one embodiment, a lookup of the volume to medium mapping table may be performed to determine the corresponding medium. In one embodiment, a volume may point to only a single medium, which may be referred to as its anchor medium.

After determining the medium pointed to by the volume, which will be referred to as the first medium for the purposes of this discussion, if the data request is a read request (conditional block 515, "read" leg), then a lookup of the first medium may be performed to locate the targeted blocks of the data request (block 520). If the data request is a write request (conditional block 515, "write" leg), then it may be determined if this is the first write to the first medium (conditional block 525). In one embodiment, it may be determined if the first medium has been previously written to by checking the status of the first medium in the medium mapping table. In one embodiment, the address space of the first medium may be split up into multiple ranges, and there may be multiple entries in the medium mapping table for these multiple ranges of the first medium. Accordingly, the storage controller may locate the appropriate entry based on the block numbers of the targeted blocks of the write request, and then the status recorded in this entry may be used to determine if this is the first write to the first medium. If the status of the first medium is masked, then this indicates the pending write request will be the first write to the first medium. If the status of the first medium is unmasked, then this indicates that the first medium has been previously written to.

If this write request is the first write to the first medium (conditional block 525, "yes" leg), then the state of the first medium may be changed to unmasked (block 530). Next, the data of the write request may be written to the storage locations on one or more storage devices allocated for the first medium (block 535), and the mappings of the first medium may be updated to track the just-written data (block 540). If this write request is not the first write to the first medium (conditional block 525, "no" leg), then method 500 may jump to block 535 and perform the write.

For a read request, if the targeted blocks are not located in the first medium (conditional block 545, "no" leg), then a lookup of the medium mapping table may be performed to determine the first medium's underlying medium (block 550). In one embodiment, the address space of the first medium may be split up into multiple ranges, and there may be multiple entries in the medium mapping table for these multiple ranges of the first medium. Accordingly, the storage controller may locate the appropriate entry based on the block numbers of the targeted blocks, and then the underlying medium recorded in this entry may be used in the subsequent steps of method 500. If the targeted blocks are located in the first medium (conditional block 545, "yes" leg), then a read of the targeted blocks may be performed (block 555).

After determining the underlying medium of the first medium (in block 550), which will be referred to as the second medium for the purposes of this discussion, method 500 may return to block 520 to perform a lookup of the second medium to locate the targeted blocks of the data request. If the targeted blocks are not located in the second medium (conditional block 545, "no" leg), then a lookup of the medium mapping table may be performed to determine the second medium's underlying medium (block 550). If the targeted blocks are located in the second medium (conditional block 545, "yes" leg), then a read of the targeted blocks may be performed (block 555). These steps may continue through as many underlying mediums as exist underneath the original medium until the targeted blocks are located.

Figure 6:
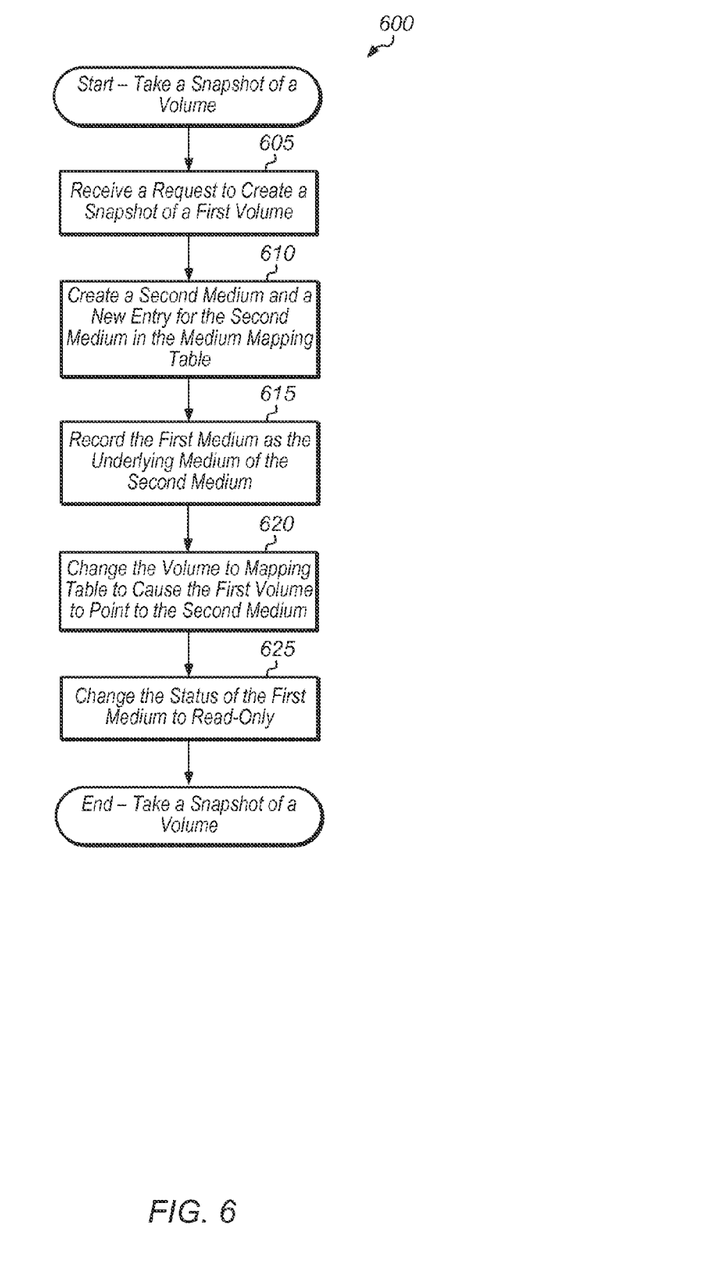
FIG. 6 is a generalized flow diagram illustrating one embodiment of a method for taking a snapshot.

Turning now to FIG. 6, one embodiment of a method 600 for taking a snapshot is shown. The components embodied in system 100 described above (e.g., storage controller 110) may generally operate in accordance with method 600. In addition, the steps in this embodiment are shown in sequential order. However, some steps may occur in a different order than shown, some steps may be performed concurrently, some steps may be combined with other steps, and some steps may be absent in another embodiment.

A request to create a snapshot of a first volume may be received by a storage controller (block 605). It may be assumed for the purposes of this discussion that the first volume is associated with (i.e., points to) a first medium. This may be determined by querying the volume to medium mapping table. In response to receiving this request, a second medium may be created and a new entry for the second medium may be created in the medium mapping table (block 610). An indication may be stored that designates the first medium as the underlying medium of the second medium (block 615). In one embodiment, this may be designated by recording the first medium as the underlying medium of the second medium in the new entry of the medium mapping table.

Then, the volume to mapping table may be changed so that the first volume is associated with the second medium (block 620). In other words, the second medium may be specified as the anchor medium of the first volume. Also, an indicator may be stored specifying that the first medium is read-only (i.e., stable) (block 625). In one embodiment, this indicator may be stored in a corresponding entry in the medium mapping table. After block 625, method 600 may end. As new writes are made to the first volume, mappings may be added to the second medium. The second medium may be marked as unmasked as soon as it receives its first write. In some embodiments, the the address space of the second medium may be split up into multiple regions in response to receiving the first write request targeting the second medium. A new entry in the medium mapping table may be created for the region targeted by the write request, and the status of the new entry may be set to unmasked. The existing entry (or existing entries) in the medium mapping table for the second medium may be modified so that the entry (or entries) maps to the portion(s) of the address space of the second medium which were not targeted by the write request. This existing entry (or entries) may remain in the masked state.

Figure 7:
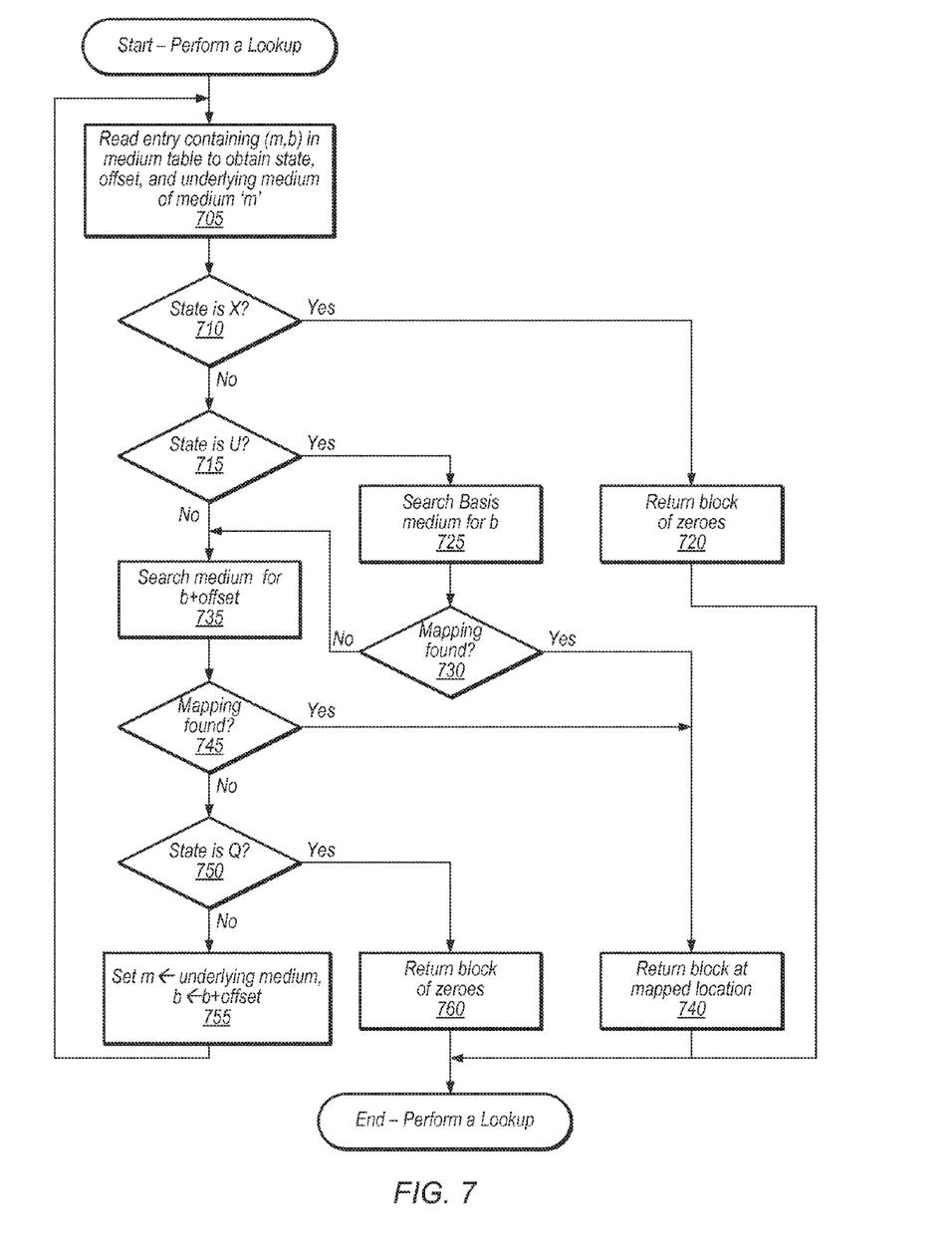
FIG. 7 is a generalized flow diagram illustrating one embodiment of a method for performing a lookup of a medium mapping table.

Referring now to FIG. 7, one embodiment of a method 700 for performing a lookup of a medium mapping table is shown. The components embodied in system 100 described above (e.g., storage controller 110) may generally operate in accordance with method 700. In addition, the steps in this embodiment are shown in sequential order. However, some steps may occur in a different order than shown, some steps may be performed concurrently, some steps may be combined with other steps, and some steps may be absent in another embodiment.

An entry of the medium mapping table containing a targeted medium and block (m, b) may be read to obtain the state, offset, and underlying medium of medium 'm' (block 705). If the state of the entry is unmapped (the data is invalid or unreachable) (indicated by a state of "X") (conditional block 710, "yes" leg), then a block of zeroes or other indication of an unmapped entry may be returned (block 720). If the state of the entry is not "X", (conditional block 710, "no" leg), then it may be determined if the state of the targeted entry is unmasked (includes valid data) (or "U") (conditional block 715). If the state of the targeted entry is unmasked (conditional block 715, "yes" leg), then the basis medium may be searched for the targeted blocks (block 725). If the mapping corresponding to the targeted blocks is found (conditional block 730, "yes" leg), then the blocks at the mapped location may be returned (block 740). After block 740, method 700 may end. If the mapping corresponding to the targeted blocks if not found (conditional block 730, "no" leg), then the medium may be searched at an offset for the targeted blocks (block 735).

If the state of the targeted entry is masked (conditional block 715, "no" leg), then the medium may be searched at an offset for the targeted blocks (block 735). Next, if the mappings of the targeted blocks are found in the medium (conditional block 745, "yes" leg), then the blocks at the mapped location may be returned (block 740). If the mappings of the targeted blocks are not found in the medium (conditional block 745, "no" leg), then it may be determined if the state of the medium is quiescent "Q" (conditional block 750). If the state of the medium is quiescent "Q" (conditional block 750, "yes" leg), then a block of zeroes may be returned (block 760). After block 760, method 700 may end.

If the state of the medium is not quiescent (conditional block 750, "no" leg), then the targeted medium may be updated to point to the underlying medium at an offset specified by the medium mapping table (block 755). This may be accomplished by querying the medium mapping table and using the entry associated with the previously searched medium to determine its underlying medium and an offset (if an offset exists). Then, method 700 may return to block 705 to read the entry of the medium mapping table for this lower-level medium ID and block address. It is noted that other embodiments may return other than all zeroes, or provide a different indication, as indicated by blocks 720 and 760.

Figure 8:
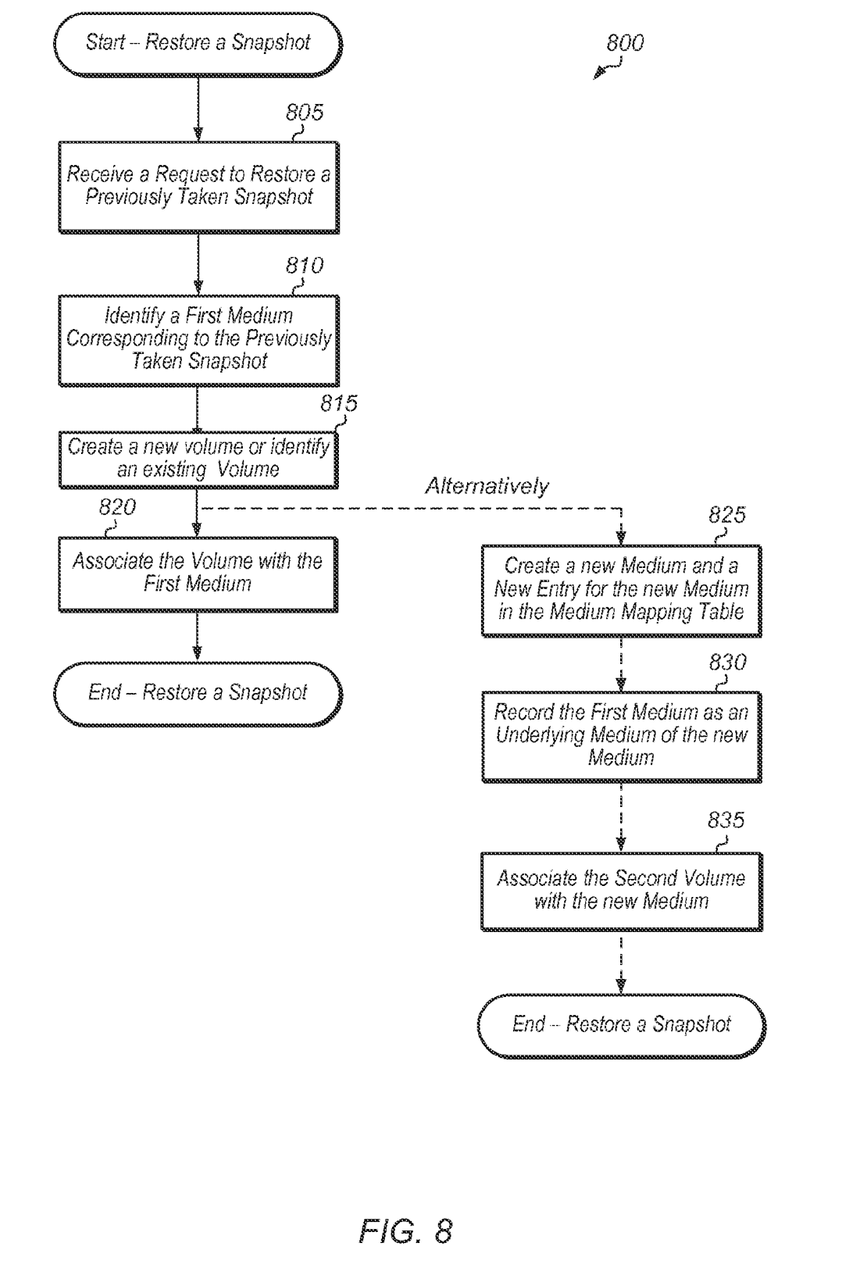
FIG. 8 is a generalized flow diagram illustrating one embodiment of a method for restoring a snapshot.

Referring now to FIG. 8, one embodiment of a method 800 for restoring a snapshot is shown. The components embodied in system 100 described above (e.g., storage controller 110) may generally operate in accordance with method 800. In addition, the steps in this embodiment are shown in sequential order. However, some steps may occur in a different order than shown, some steps may be performed concurrently, some steps may be combined with other steps, and some steps may be absent in another embodiment.

A request to restore a previously taken snapshot may be received by a storage controller (block 805). In various embodiments, the previously taken snapshot may be identified by a timestamp along with other identifying information. In response to receiving the request, the storage controller may identify the medium corresponding to the previously taken snapshot (block 810). For the purpose of this discussion, the medium corresponding to the request may be referred to as the first medium. Also in response to receiving the request to restore the previously taken snapshot, a volume may be created (block 815) that is to be associated with the restored snapshot. Alternatively, an existing volume may be utilized for association with the restored snapshot. Next, the restored snapshot is associated with a volume. For example, a volume to medium mapping table may be updated so that the volume points to (or is associated with) the first medium (block 820).

Alternatively, after block 815, rather than performing block 820, a separate route through method 800 may be implemented. In this alternative implementation, a new medium may be created and a new entry (corresponding to the new medium) may be created in the medium mapping table (block 825). The new medium may have the first medium recorded as its underlying medium in the new entry (block 830). Also, the volume to medium mapping table may be updated so that the second volume points to the new medium (block 835). After block 835, the alternative implementation of method 800 may end. The storage controller may return an ID of the second volume to the user responsible for generating the snapshot request, and then the user may access the snapshot data by generating requests using the second volume ID.

Figure 9:
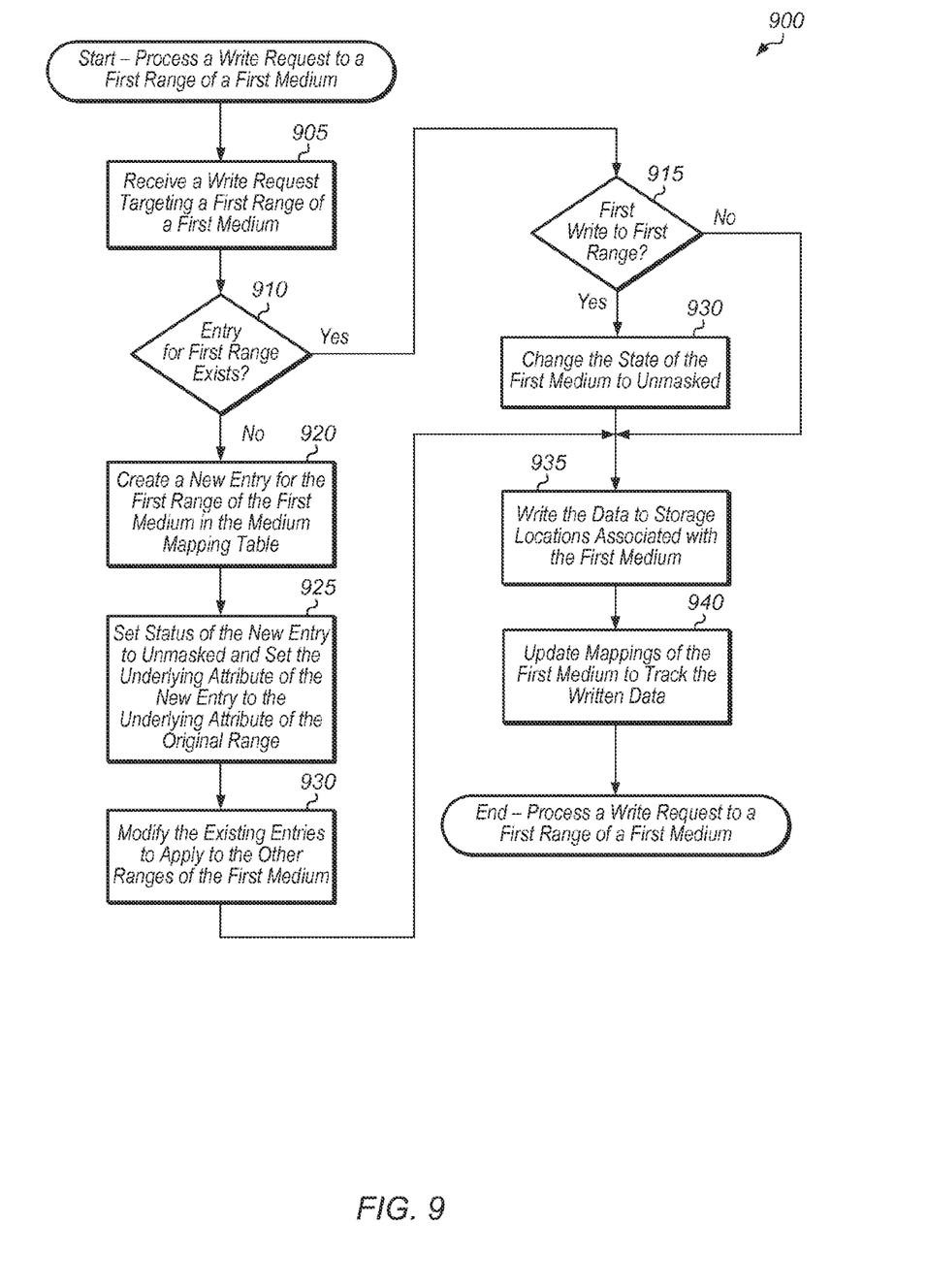
FIG. 9 is a generalized flow diagram illustrating one embodiment of a method for processing a write request to a portion of a medium.

Referring now to FIG. 9, one embodiment of a method 900 for processing a write request to a portion of a medium is shown. The components embodied in system 100 described above (e.g., storage controller 110) may generally operate in accordance with method 900. In addition, the steps in this embodiment are shown in sequential order. However, some steps may occur in a different order than shown, some steps may be performed concurrently, some steps may be combined with other steps, and some steps may be absent in another embodiment.

A write request targeting a first range of a first medium may be received by the storage controller (block 905). The first range refers to a portion of the address space of the first medium, such that the other ranges of the address space remain unchanged after the write request is completed to the first range. In some cases, the first range may be larger than the size of the write request. For example, the first range may be 16 megabytes (MB) and the write request may be to a 4 kilobyte (KB) block within the first range. These and other embodiments are possible and are contemplated.

If the first range is in the middle of the address space of the first medium, there may be a first unchanged range in the first medium for block numbers smaller than the first range and a second unchanged range in the first medium for block numbers larger than the first range. In response to receiving the write request, the storage controller may determine if there is already an entry corresponding to the first range of the first medium in the medium mapping table (conditional block 910). The status of the first medium at the point in time when the write request is received may vary on a case by case basis. The storage controller may determine the specific circumstances that exist for the first medium by querying the medium mapping table.

In one scenario, the first medium may have a single entry in the medium mapping table for its entire address space. In another scenario, the address space of the first medium may already be split up into two or more separate ranges. In this scenario, the medium mapping table may include a separate entry for each separate range of the first medium, and the first range may or may not already have its own entry. For example, if the first range covers block numbers 0-199, and there is an entry for the range of 0-199, then the first range already has its own entry since there is no way to reduce the range of this entry. Alternatively, if the first range covers block numbers 0-199, and there's an entry for the range of 0-599, then this entry may be split up into two entries, one for block numbers 0-199 and a second for block numbers 200-599.

If there is already a separate entry for the first range of the first medium in the medium mapping table (conditional block 910, "yes" leg), then the storage controller may determine if this is the first write to the first range of the first medium (conditional block 915). If there is not a separate entry for the first range of the first medium in the medium mapping table (conditional block 910, "no" leg), then the storage controller may create a new entry for the first range of the first medium in the medium mapping table (block 920). The status of this new entry may be set to unmasked and the underlying attribute may be set to the underlying attribute of the original range (block 925). The existing entry (or entries) may be modified so that they only apply to ranges of the address space of the first medium which fall outside the first range (block 930). After changing the range numbers for these existing entries, the other attributes for these existing entries may remain the same. Next, the data of the write request may be written to the storage locations on one or more storage devices allocated for the first medium (block 935), and the mappings of the first medium may be updated to track the just-written data (block 940). After block 940, method 900 may end.

If this is the first write to the first range of the first medium (conditional block 915, "yes" leg), then the status of the entry corresponding to the first range of the first medium may be changed to unmasked (block 945). After block 945, method 900 may jump to block 935 to write the data of the write request to the appropriate storage locations. If this is not the first write to the first range of the first medium (conditional block 915, "no" leg), then method 900 may jump to block 935 to write the data of the write request to the appropriate storage locations.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer system comprising:
one or more storage devices; and
a storage controller;
wherein the storage controller is configured to:
in response to receiving a request addressing a first volume and indicating a command to take a snapshot of the first volume, wherein the first volume is mapped to a first logical grouping of data:
create a second logical grouping of data;
map the second logical grouping of data to reference the first logical grouping of data;
remap the first volume to map to the second logical grouping of data instead of the first logical grouping of data such that the first volume remains addressable with similar access permissions before and after creating the snapshot; and
store an indication that the first logical grouping of data is read-only; and
in response to receiving a write request targeting the second logical grouping, split the second logical grouping into a plurality of ranges including a first range and a second range; wherein the first range of the second logical grouping maps to the first logical grouping, and the second range of the second logical grouping maps to a third logical grouping of data.

2. The computer system as recited in claim 1, wherein the storage controller is further configured to write first data to the second logical grouping of data responsive to receiving a write request targeting the first volume, wherein the first data corresponds to the write request, and wherein the write request is received after taking the snapshot of the first volume.

3. The computer system as recited in claim 1, wherein a graph depicts a respective level of logical groupings of data for each respective snapshot created of the first volume, and wherein the storage controller is further configured to:
for each of a plurality of requests to create a respective plurality of snapshots of the first volume:
create an additional level of the graph, wherein the additional level corresponds to an additional logical grouping of data;
remap the first volume to the additional logical grouping of data;
store, within the additional logical grouping, a reference to a previous logical grouping of data to which the first volume was mapped; and
store an indication that the previous logical grouping of data is read-only.

4. The computer system as recited in claim 3, further comprising a volume to logical grouping of data mapping table, wherein the second logical grouping of data is recorded as an anchor logical grouping of data of the first volume in a corresponding entry in a volume to logical grouping data mapping table.

5. The computer system as recited in claim 4, wherein responsive to receiving a read request for first data of the first volume, the storage controller is configured to:
determine which logical grouping of data is the anchor logical grouping of data of the first volume;
responsive to determining the second logical grouping of data is the anchor logical grouping of data of the first volume, perform a lookup in the second logical grouping of data for the first data;
responsive to determining the first data is not located in the second logical grouping of data, determine an underlying logical grouping of data of the second logical grouping of data; and
responsive to determining a first logical grouping of data is the underlying logical grouping of data of the first logical grouping of data, perform a lookup in the first logical grouping of data for the first data.

6. The computer system as recited in claim 5, wherein responsive to receiving a write request of second data to the first volume, the storage controller is further configured to store an indication that the second logical grouping of data is unmasked responsive to determining no previous write requests have been made to the second logical grouping of data.

7. The computer system as recited in claim 1, wherein prior to receiving the request to take the snapshot of the first volume, the status of the first logical grouping of data was read-write.

8. A method comprising:
receiving a request identifying a first volume and indicating a command to take a snapshot of the first volume, wherein the first volume is mapped to a first logical grouping of data; and
responsive to receiving the request:
creating a second logical grouping of data;
mapping the second logical grouping of data to reference the first logical grouping of data;
remapping the first volume to map to the second logical grouping of data instead of the first logical grouping of data such that the first volume remains addressable with similar access permissions before and after creating the snapshot; and
storing an indication that the first logical grouping of data is read-only; and
in response to receiving a write request targeting the second logical grouping, split the second logical grouping into a plurality of ranges including a first range and a second range; wherein the first range of the second logical grouping maps to the first logical grouping, and the second range of the second logical grouping maps to a third logical grouping of data.

9. The method as recited in claim 8, further comprising writing first data to the second logical grouping of data responsive to receiving a write request targeting the first volume, wherein the first data corresponds to the write request, and wherein the write request is received after taking the snapshot of the first volume.

10. The method as recited in claim 8, further comprising determining which logical grouping of data is associated with the first volume responsive to receiving the request to take the snapshot of the first volume.

11. The method as recited in claim 10, wherein the second logical grouping of data is recorded as an anchor logical grouping of data of the first volume in a corresponding entry in a volume to logical grouping data mapping table.

12. The method as recited in claim 11, wherein responsive to receiving a read request for first data of the first volume, the method comprising:
   determining which logical grouping of data is the anchor logical grouping of data of the first volume;
   responsive to determining the second logical grouping of data is the anchor logical grouping of data of the first volume, performing a lookup in the second logical grouping of data for the first data;
   responsive to determining the first data is not located in the second logical grouping of data, determining an underlying logical grouping of data of the second logical grouping of data; and
   responsive to determining a first logical grouping of data is the underlying logical grouping of data of the first logical grouping of data, performing a lookup in the first logical grouping of data for the first data.

13. The method as recited in claim 12, wherein responsive to receiving a write request of second data to the first volume, the method comprising storing an indication that the second logical grouping of data is unmasked responsive to determining no previous write requests have been made to the second logical grouping of data.

14. The method as recited in claim 8, wherein prior to receiving the request to take the snapshot of the first volume, the status of the first logical grouping of data was read-write.

15. A non-transitory computer readable storage medium storing program instructions, wherein the program instructions are executable by a processor to:
   in response to receiving a request identifying a first volume and indicating a command to take a snapshot of the first volume, wherein the first volume is mapped to a first logical grouping of data:
      create a second logical grouping of data;
      map the second logical grouping of data to reference the first logical grouping of data;
      remap the first volume to map to the second logical grouping of data instead of the first logical grouping of data such that the first volume remains addressable with similar access permissions before and after creating the snapshot; and
      store an indication that the first logical grouping of data is read-only; and
   in response to receiving a write request targeting the second logical grouping, split the second logical grouping into a plurality of ranges including a first range and a second range; wherein the first range of the second logical grouping maps to the first logical grouping, and the second range of the second logical grouping maps to a third logical grouping of data.

16. The computer readable storage medium as recited in claim 15, wherein the program instructions are further executable by a processor to write first data to the second logical grouping of data responsive to receiving a write request targeting the first volume, wherein the first data corresponds to the write request, and wherein the write request is received after taking the snapshot of the first volume.

17. The computer readable storage medium as recited in claim 15, wherein the program instructions are further executable by a processor to determine which logical grouping of data is associated with the first volume responsive to receiving the request to take the snapshot of the first volume.

18. The computer readable storage medium as recited in claim 17, wherein responsive to receiving a read request for first data of the first volume, the program instructions are executable by a processor to:
   determine which logical grouping of data is an anchor logical grouping of data of the first volume;
   responsive to determining the second logical grouping of data is the anchor logical grouping of data of the first volume, perform a lookup in the second logical grouping of data for the first data;
   responsive to determining the first data is not located in the second logical grouping of data, determine an underlying logical grouping of data of the second logical grouping of data; and
   responsive to determining a first logical grouping of data is the underlying logical grouping of data of the first logical grouping of data, perform a lookup in the first logical grouping of data for the first data.

19. The computer readable storage medium as recited in claim 18, wherein responsive to receiving a write request of second data to the first volume, the program instructions are executable by a processor to store an indication that the second logical grouping of data is unmasked responsive to determining no previous write requests have been made to the second logical grouping of data.

20. The computer readable storage medium as recited in claim 15, wherein prior to receiving the request to take the snapshot of the first volume, the status of the first logical grouping of data was read-write.

\* \* \* \* \*